United States Patent
Yu et al.

(10) Patent No.: US 9,842,085 B2
(45) Date of Patent: Dec. 12, 2017

(54) ADDER CAPABLE OF SUPPORTING ADDITION AND SUBTRACTION OF UP TO N-BIT DATA AND METHOD OF SUPPORTING ADDITION AND SUBTRACTION OF A PLURALITY OF DATA TYPE USING THE ADDER

(71) Applicant: Samsung Electronics Co., Ltd., Suwon-si (KR)

(72) Inventors: Hyeong-Seok Yu, Seoul (KR); Suk-Jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 885 days.

(21) Appl. No.: 14/166,076

(22) Filed: Jan. 28, 2014

(65) Prior Publication Data
US 2014/0214913 A1   Jul. 31, 2014

(30) Foreign Application Priority Data
Jan. 28, 2013  (KR) .................. 10-2013-0009328

(51) Int. Cl.
*G06F 7/503*  (2006.01)
*G06F 7/507*  (2006.01)
*G06F 17/10*  (2006.01)

(52) U.S. Cl.
CPC ............ *G06F 17/10* (2013.01); *G06F 7/503* (2013.01); *G06F 7/507* (2013.01); *G06F 2207/382* (2013.01); *G06F 2207/3828* (2013.01)

(58) Field of Classification Search
CPC .......... G06F 7/503; G06F 7/506–7/507; G06F 2207/3816; G06F 7/382

USPC .................................................. 708/714, 518
See application file for complete search history.

(56) References Cited

U.S. PATENT DOCUMENTS

| | | | | |
|---|---|---|---|---|
| 4,707,800 A | * | 11/1987 | Montrone | G06F 7/506 708/518 |
| 5,883,824 A | * | 3/1999 | Lee | G06F 7/505 708/445 |
| 5,943,251 A | | 8/1999 | Jiang et al. | |

(Continued)

FOREIGN PATENT DOCUMENTS

| | | |
|---|---|---|
| GB | 2 172 129 A | 9/1986 |
| JP | 61204736 A | 9/1986 |

(Continued)

OTHER PUBLICATIONS

G. Paci, et al., "Exploration of Low Power Adders for a SIMD Data Path", Proceeding of ASP-DAC, IEEE, 2007, pp. 914-919.

(Continued)

*Primary Examiner* — Matthew Sandifer
(74) *Attorney, Agent, or Firm* — Sughrue Mion, PLLC (57) ABSTRACT

An adder for supporting multiple data types by controlling a carry propagation is provided. The adder includes a plurality of first addition areas configured to receive pieces of incoming operand data, wherein each of the plurality of first addition areas includes a predetermined unit number of bits, and a plurality of second addition areas configured to receive pieces of control data based on a type of the operand data and an operation type, wherein the plurality of second addition areas are alternately arranged between the plurality of first addition areas.

25 Claims, 9 Drawing Sheets

(56) References Cited

U.S. PATENT DOCUMENTS

| | | | | |
|---|---|---|---|---|
| 6,140,839 A * | 10/2000 | Kaviani | ........... | H03K 19/17728 |
| | | | | 326/39 |
| 6,408,320 B1 * | 6/2002 | Shiell | ...................... | G06F 7/505 |
| | | | | 708/518 |
| 6,449,629 B1 * | 9/2002 | Morgan | .................. | G06F 7/509 |
| | | | | 708/518 |
| 7,441,105 B1 * | 10/2008 | Metzgen | ............... | G06F 9/3001 |
| | | | | 712/220 |
| 7,516,173 B2 | 4/2009 | Wijeratne | | |
| 2005/0172108 A1 * | 8/2005 | Wu | ..................... | G06F 9/30098 |
| | | | | 712/228 |
| 2006/0004902 A1 * | 1/2006 | Simanapalli | .......... | G06F 7/4812 |
| | | | | 708/670 |
| 2010/0030837 A1 | 2/2010 | Stansfield | | |

FOREIGN PATENT DOCUMENTS

| | | |
|---|---|---|
| JP | 20109592 A | 1/2010 |
| KR | 1998-041753 A | 8/1998 |
| KR | 2000-0044663 A | 7/2000 |

OTHER PUBLICATIONS

Lamdan, et al., "A circuit for high-speed carry propagation in l.s.i.-f.e.t. technology", Radio and Electronic Engineer, Jul. 1976, vol. 46, No. 7, pp. 337-341, London, Great Britain, XP 007907762.
Communication dated Feb. 18, 2016, issued by the European Patent Office in counterpart European Patent Application No. 14152909.9.
Communication dated Apr. 28, 2014, issued by the European Patent Office in counterpart European Application No. 14152909.9.

* cited by examiner

| FIRST CONTROL BIT | SECOND CONTROL BIT | FUNCTION |
|---|---|---|
| 0 | 1 | CARRY PROPAGATING |
| 0 | 0 | CARRY BLOCKING |
| 1 | 1 | ADD VALUE 1 FOR 2'S COMPLIMENT |

FIG. 4A 1. a1(01) + b1(10) = 11
2. a2(11) + b2(01) = 00

|  | PRECEDING FIRST ADDITION AREA | SECOND ADDITION AREA | FOLLOWING FIRST ADDITION AREA |
|---|---|---|---|
| FIRST DATA | 0 1 | 0 | 1 1 |
| SECOND DATA | 1 0 | 0 | 0 1 |
| RESULT | 1 1 | 1 | 0 0 |

FIG. 4B 3. a(0111) + b(1001) = 0000

|  | PRECEDING FIRST ADDITION AREA | SECOND ADDITION AREA | FOLLOWING FIRST ADDITION AREA |
|---|---|---|---|
| FIRST DATA | 0 1 | 1 | 1 1 |
| SECOND DATA | 1 0 | 0 | 0 1 |
| RESULT | 0 0 | 0 | 0 0 |

FIG. 4C 4. a1(01) - b1(10) = 01 + 01 + 1 = 11
5. a2(11) - b2(01) = 11 + 10 + 1 = 10

|  | PRECEDING FIRST ADDITION AREA | SECOND ADDITION AREA | FOLLOWING FIRST ADDITION AREA |
|---|---|---|---|
| FIRST DATA | 0 1 | 1 | 1 1 |
| SECOND DATA | 0 1 | 1 | 1 0 |
| RESULT | 1 1 | 1 | 1 0 |

|  | PRECEDING FIRST ADDITION AREA | SECOND ADDITION AREA | FOLLOWING FIRST ADDITION AREA |
|---|---|---|---|
| FIRST DATA | 0 1 | 1 | 1 1 |
| SECOND DATA | 0 1 | 0 | 1 0 | ← 1
| RESULT | 1 1 | 0 | 1 0 |

ADDER CAPABLE OF SUPPORTING ADDITION AND SUBTRACTION OF UP TO N-BIT DATA AND METHOD OF SUPPORTING ADDITION AND SUBTRACTION OF A PLURALITY OF DATA TYPE USING THE ADDER

CROSS-REFERENCE TO RELATED APPLICATION

This application claims priority from Korean Patent Application No. 10-2013-0009328, filed on Jan. 28, 2013, in the Korean Intellectual Property Office, the entire disclosure of which is incorporated herein by reference for all purposes.

BACKGROUND

1. Field

Apparatuses and methods consistent with following description relate to an adder for supporting a plurality of data types and thereby a method of supporting an addition and subtraction operation of a plurality of data types by controlling a carry propagation.

2. Description of the Related Art

Providing a processor with a vector operation capability may provide a performance improvement to multimedia application fields. A general vector operator may offer an ability to simultaneously process various data at one time; however, because it may require different operators to respond to the various data, the vector operator may need to be large. To help deal with these considerations, a structure that can connect, share, and simultaneously process many arithmetic operators with a minimum data length may be used to support various data types. For example, a carry-select adder with consideration for carry propagation for an addition or subtraction operation may be implemented. A carry-select adder may use complex control signals and a plurality of multiplexers to share an operation for each type, which may decrease overall efficiency and processing speed.

SUMMARY

According to an aspect of an exemplary embodiment, there is provided an adder including a plurality of first addition areas configured to receive pieces of incoming operand data, wherein each of the plurality of first addition areas includes a predetermined unit number of bits, and a plurality of second addition areas configured to receive pieces of control data based on a type of the operand data and an operation type, wherein of the plurality of second addition areas are alternately arranged between the plurality of first addition areas.

The predetermined unit number of bits may be smaller than a maximum number of bits on which the adder is capable of processing an operation.

The pieces of incoming operand data may be received by at least one of the plurality of first addition areas in units of predetermined bits corresponding to a operand data type.

The adder may further include a plurality of first multiplexers configured to selectively invert or non-invert operand data from among the pieces of incoming operand data before being input at the plurality of first addition areas based on the operation type, and then input resulting data to the plurality of first addition areas.

The pieces of control data may be configured to control at least one of propagation or blocking of a carry signal from a following first addition area of the plurality of first addition areas, through a second addition area that received the pieces of control data from among the plurality of second addition areas, to a preceding first addition area of the plurality of first addition areas, and adding value '1' to take a two's complement in response to the operation type being subtraction.

The control data that is input to a second addition area between the preceding first addition area and the following first addition area may be a bit [0, 1] or [1, 0] to transmit a carry signal, in response to one piece of operand data being divided into two segments and the data segments being separately input to the preceding first addition area and the following first addition area.

The control data that is input to the second addition area between the preceding first addition area and the following first addition area may be a bit [0, 0] to block the carry signal, in response to the type of operation being addition and two different pieces of operand data being simultaneously input to both the preceding first addition area and the following first addition area.

The control data that is input to the second addition area between the preceding first addition area and the following first addition area may be a bit [1, 1] to add value '1' for taking a two's complement, in response to the type of operation being subtraction and two different pieces of operand data being simultaneously input to the preceding first addition area and the following first addition area.

The adder may further include at least one second multiplexer configured to selectively input the pieces of control data to a second addition area from among the plurality of second addition areas, that is disposed between a preceding first addition area from among the plurality of first addition areas and a following first addition area from among the plurality of first addition areas, based on types of the operand data that are input to the following first addition area and the preceding first addition area and the operation type.

According to an aspect of another exemplary embodiment, there is provided a method of supporting addition and subtraction using an adder, the method including inputting pieces of operand data to a plurality of first addition areas each formed with a predetermined unit number of bits in the adder, inputting pieces of control data based on a type of the operand data and an operation type to a plurality of second addition areas each alternately arranged between the plurality of first addition areas.

The predetermined unit number of bits of a first addition area from among the plurality of first addition areas may be smaller than a maximum number of bits on which the adder is capable of processing.

The pieces of operand data may be input to at least one first addition area from among the plurality of first addition areas, in units of predetermined bits based on a operand data type.

Inputting of the pieces of operand data may further include selectively inverting or non-inverting operand data from among the pieces of incoming operand data before being received at the plurality of first addition areas based on the operation type, and inputting resulting data to the plurality of first addition areas.

The pieces of control data may be configured to control at least one of propagation or blocking of a carry signal from a following first addition area of the plurality of first addition areas, through a second addition area that received the pieces of control data from among the plurality of second addition areas, to a preceding first addition area of the plurality of first addition areas, and adding value '1' to take a two's complement in response to the operation type being subtraction.

The control data that is input to a second addition area between the preceding first addition area and the following first addition area may be a bit [0, 1] or [1, 0] to transmit a carry signal, in response to one piece of operand data being divided into two segments and the data segments being separately input to the preceding first addition area and the following first addition area.

The control data that is input to the second addition area between the preceding first addition area and the following first addition area may be a bit [0, 0] to block the carry signal, in response to the type of operation being addition and two different pieces of operand data being simultaneously input to both the preceding first addition area and the following first addition area.

The control data that is input to the second addition area between the preceding first addition area and the following first addition area may be a bit [1, 1] to add value '1' for taking a two's complement, in response to the type of operation being subtraction and two different pieces of operand data being simultaneously input to the preceding first addition area and the following first addition area.

The inputting of the pieces of control data may include selectively inputting the pieces of control data to a second addition area, from among the plurality of second addition areas, between a preceding first addition area and a following first addition area from among the plurality of first addition areas, based on the type of the operand data that is input to the preceding first addition area and the following first addition area and the operation type.

BRIEF DESCRIPTION OF THE DRAWINGS

The above and other aspects will be more apparent from the following detailed description of exemplary embodiment taken in conjunction with the accompanying drawings, in which.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Hereinafter, an adder capable of supporting multiple data types and a method of supporting addition and subtraction operations of multiple data types using the adder will now be described with reference to the accompanying drawings.

Figure 1A:
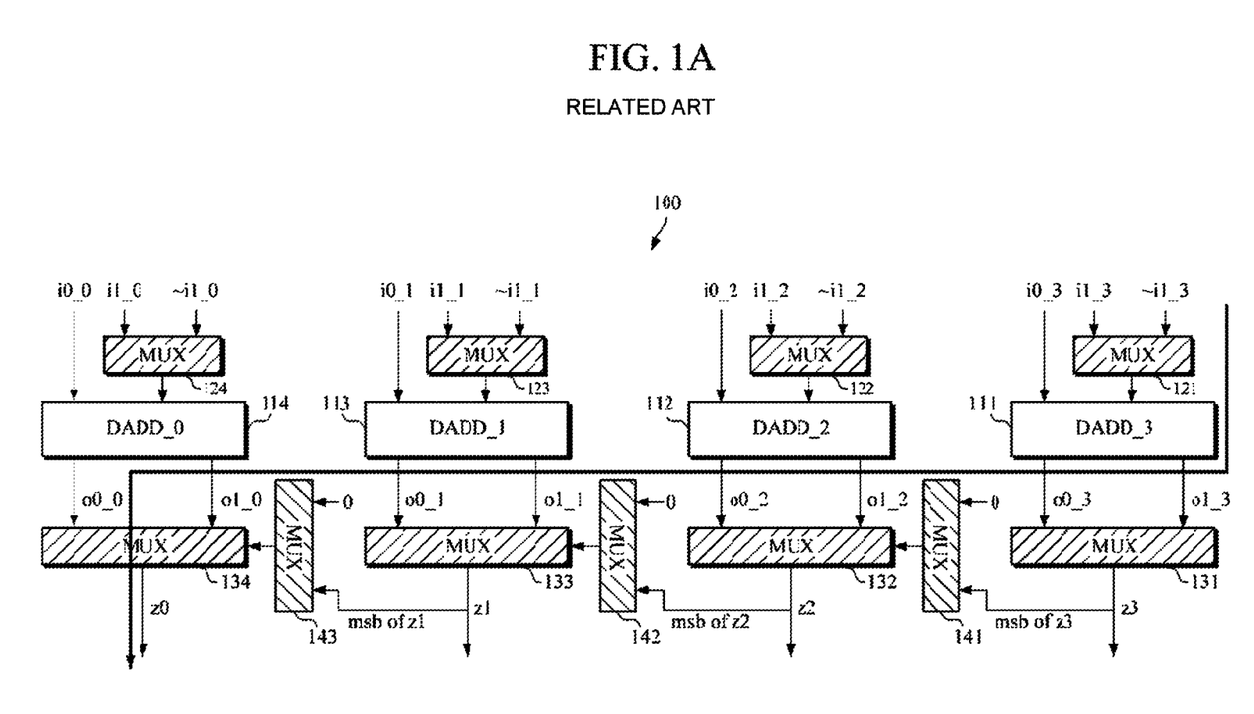
FIGS. 1A and 1B are diagrams illustrating examples of a general carry-select adder.
Figure 1B:
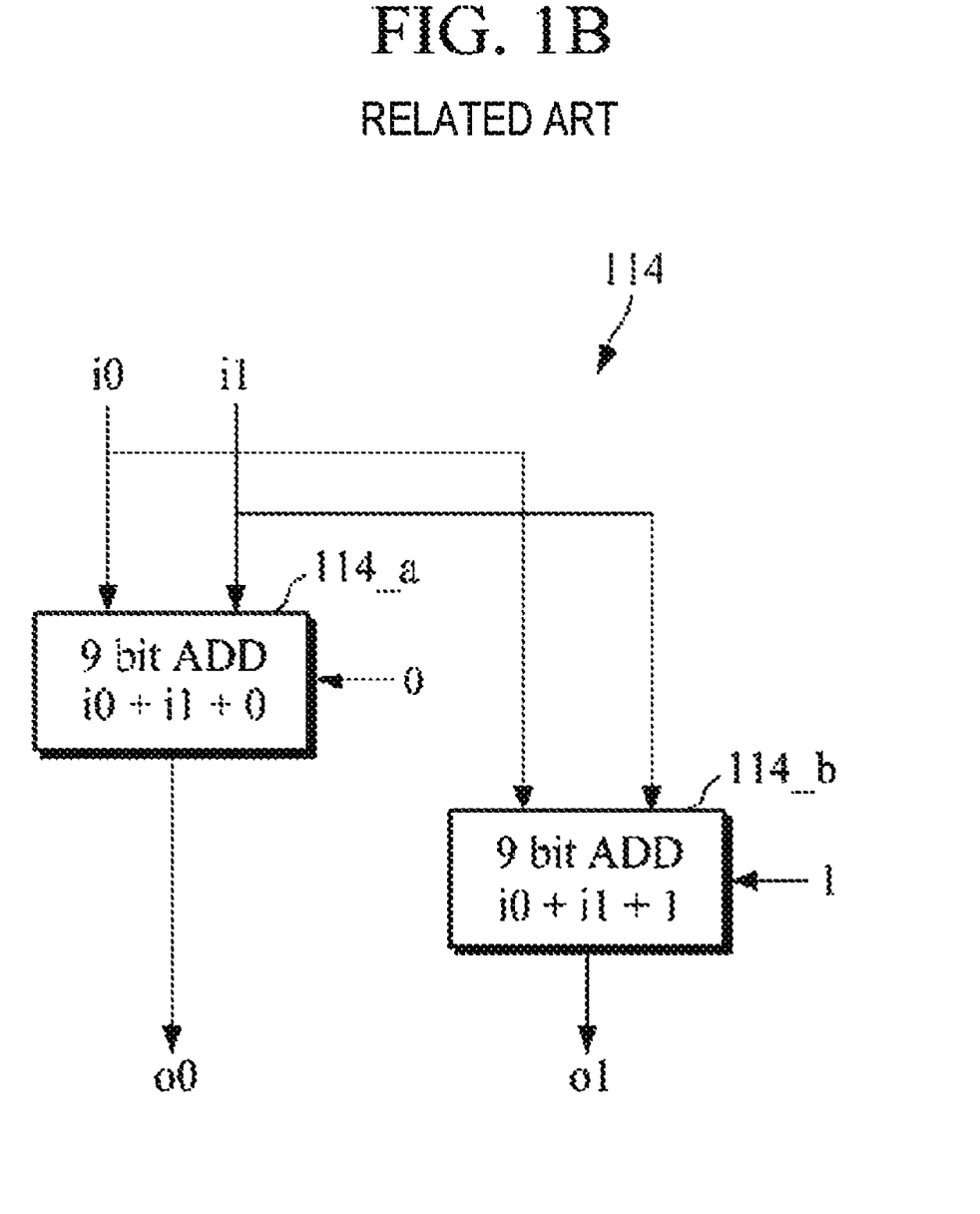

FIGS. 1A and 1B are diagrams illustrating examples of a general carry-select adder.

FIG. 1A is a diagram illustrating an example of a general carry-select adder for supporting up to 32 bits, and the adder supports an addition operation of multiple data types (for example: 8, 16 and 32 bits) by connecting four adders 111, 112, 113, and 114 in parallel. In this example, as shown in FIG. 1B which illustrates an adder 114, each of the adders 111, 112, 113, and 114 may include double 9-bit adders 114_a and 114_b in order to consider in advance a carry-in for adding a value of '1' with respect to an inverted input in the process of subtraction.

Also, the general carry-select adder may include multiplexers 121, 122, 123, and 124 to select an inverted or non-inverted input according to an operation type with respect to second data that is input to the respective adders 111, 112, 113, and 114; carry-select multiplexers 131, 132, 133, and 134 to select one of two results (carry-in non-included and carry-in included) output from the respective adders 111, 112, 113, and 114; and carry-propagate multiplexers 141, 142 and 143 to propagate a carry from following adders 111, 112, and 113 to preceding adders 112, 113, and 114, respectively.

For example, when performing an addition operation with respect to 16-bit data, data i0_3 and i1_3 are input to the first adder 111, and data i0_2 and i1_2 are input to the second adder 112. By selecting one of either a result which does not include a carry-in or a result including a carry-in, the first adder 111 outputs data o0_3 and o1_3 using the double adders inside, and also the second adder 112 outputs data o0_2 and o1_2.

The first carry-select multiplexer 131 selects data o0_3, which does not include a carry-in, from results outputted from the first adder 111, and outputs the data o0_3 as an addition result z3 of the first adder 111. The first carry-propagate multiplexer 141 selects either the highest bit value of the addition result z3 of the first adder 111 or value '0', and determines whether to propagate a carry to the second adder 112.

The second carry-select multiplexer 132 selects one of results outputted from the second adder 112, that is, one of data o0_2 that does not include a carry-in and data o1_2 that includes a carry-in, according to the value that is input to the first carry propagation multiplexer 141, and outputs the selected data as its addition operation result z2.

As such, the general carry-select adder includes a plurality of adders 111, 112, 113, and 114 to support operations of multiple data types, and each of the adders 111, 112, 113 or 114 includes adders in parallel to consider a carry-in in advance, and therefore the general carry-select adder occupies a plurality of areas. In addition, because data should pass through a number of multiplexers for carry propagation, the control becomes complicated and also an operation delay occurs.

Figure 2:
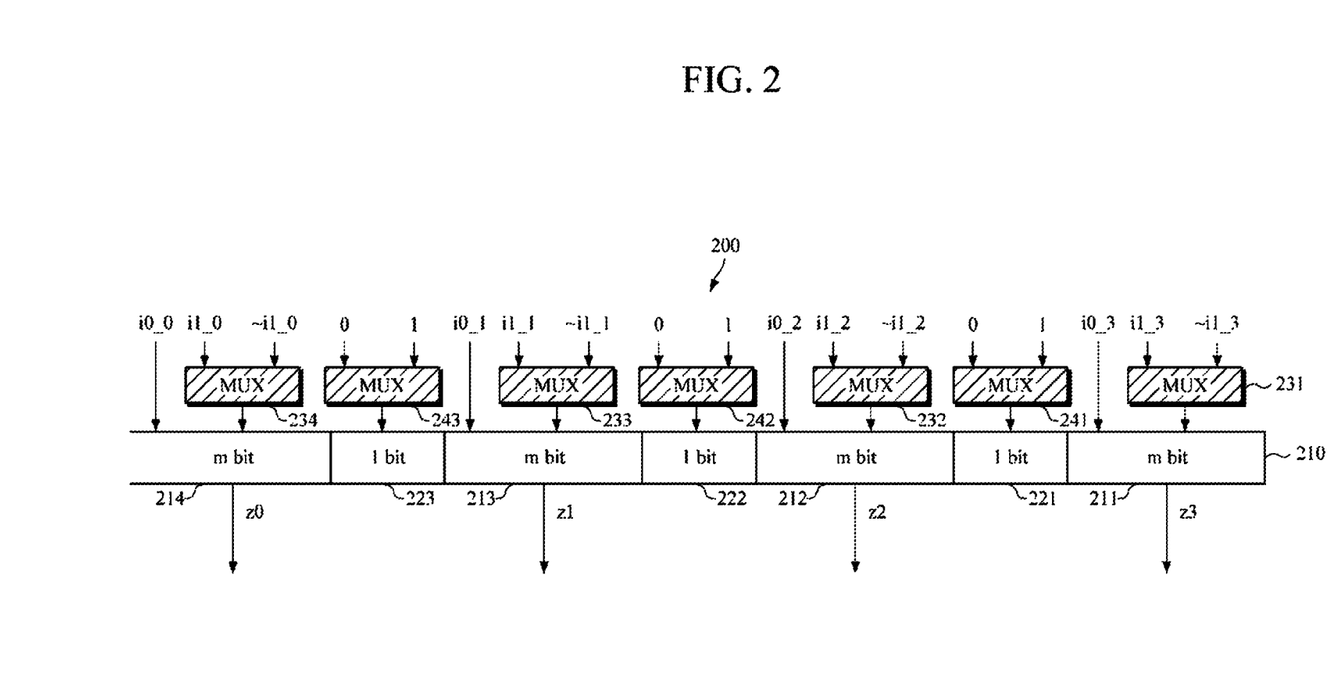
FIG. 2 is a diagram illustrating an adder according to an exemplary embodiment.

FIG. 2 is a diagram illustrating an adder according to an exemplary embodiment.

Referring to FIG. 2, the adder 200 may include a single addition unit 210, which may include a plurality of first addition areas 211, 212, 213, and 214 in units of a predetermined number of bits to support operations of various data types within a maximum data length, and one or more second addition areas 221, 222, and 223, each of which is disposed between two adjacent first addition areas and to which control data is input based on operation types and operand data types.

FIG. 2 shows four of the first addition areas 211, 212, 213, and 214 and three of the second addition areas 221, 222, and 233 between the first addition areas. However, the number of the first and second addition areas may increase according to a maximum supportable data type, a minimum data processing unit of an operation, and the like.

For example, according to an exemplary embodiment, each of the first addition areas 211, 212, 213 and 214 may be separated into a minimum data processing unit of an operation, and if a minimum data processing unit is 8 bits, an operation of a maximum 32-bit data type may be performed via four of the first addition areas 211, 212, 213 and 214. Depending on a type of incoming operand data, operations for data types, such as 8 bits, 16 bits, 24 bits and 32 bits may be performed.

The operand data may be input to one or more first addition areas 211, 212, 213, and 214 in units of predetermined bits (m bits) depending on the data type, and addition is performed on the operand data by each of the first addition areas. In this case, depending on the operand data type, more than two pairs of the operand data may be simultaneously input to the first addition areas 211, 212, 213 and 214.

For example, if a predetermined bit (m-bit) is 8 bits and an operand data type is 16 bits, the operand data may be separated into 8-bit units and be input to the two of the first addition areas 211 and 212. In this case, a pair of 16-bit operand data may be additionally divided into units of 8 bits, and may be input to two of the first addition areas 213 and 214, and thereby addition operations of two or more pairs of data may be simultaneously performed.

According to one or more exemplary embodiments, although units of 8, 16 and 32 bits are described, longer or shorter bit counts are possible. Further, the bit length is not limited to being in multiples of 8 as the bit length. Particularly, according to one or more exemplary embodiments, the bit length may be in multiples of 3, 9, 10, and 45 bits any of which may also be applicable.

In addition, the adder 200 may support a subtraction operation. The subtraction operation is performed by inverting operand data which is second input, then performing addition on the second input operand data, and adding value '1' for taking the two's complement. To support this subtraction operation, the adder 200 may further include first multiplexers 231, 232, 233, and 234 corresponding to the respective first addition areas 211, 212, 213, and 214. The first multiplexers 231, 232, 233, and 234 may selectively invert or non-invert operand data, which is to be input later through the multiplexers directly to the addition areas, and input resultant operand data to the corresponding first addition areas 211, 212, 213, and 214, depending on the type of operation to be performed. For example, if the operation type is subtraction, the first multiplexers 231, 232, 233, and 234 may invert the following operand data and then input the resultant data to the corresponding first addition areas 211, 212, 213 and 214.

Further, according to an exemplary embodiment, an inverted value may be obtained by a certain logic unit connected to an input multiplexer in a stage that exists before an adder, and may be executed according to a command designating a subtraction operation. Further, in the case of a subtraction operation, the subtrahend, which may be a complementary of 1, may have a '1' value added thereby becoming the complementary number of '2'. Adding this value, particularly the complementary number of 2, to the minuend may actually provide a subtraction of the value stored therewith. The addition by "1" is normally operated on the Least Significant Bit (LSB) of the subtrahend, however, in the present exemplary embodiment the carry, which is the result of inputting (1,1) to the divided addition areas 223, 222, and 221, is added to the LSB. That is, when initially adding the '1' value, this '1' value is specifically entered through a carry, which is the result of inputting (1,1) to the divided addition areas 223, 222, and 221, which is generated and then added to the least significant bit (LSB).

According to one or more exemplary embodiments, it may be possible that two different length values may be added or subtracted from each other. This may be done by having the shorter value padded and entered. Further, the system shown in FIG. 2 may be used to add or subtract the values. Specifically, an augend value and an addend value may not necessarily have a same length. Similarly, a minuend and a subtrahend may also not necessarily have the same length. Said another way, according to one or more exemplary embodiments, augend and addend or the minuend and subtrahend may have different lengths. In the event that the lengths are different, the shorter data may be padded to the length of the longer data. When the lengths are different, the sign types should be the same. The sign type of a certain data corresponds to whether the value is a complementary number or an unsigned number, and so on.

According to one or more exemplary embodiments, in an exemplary embodiment where the shorter value is a complementary number of two, the sign bit may be expanded. In an exemplary embodiment where the shorter value is an unsigned value, 0's may be expanded to the upper bit. In an exemplary embodiment where the shorter value is a sign-magnitude, a sign bit may be laid on the most significant bit (MSB) and 0's may be padded in the remaining expanded length.

According to one or more exemplary embodiments, the addition areas 214, 213, 212, and 211 may be used to add two values that are of different lengths as discussed above, where each addition area uses (i0_0, i1_0), (i0_1, i1_1), (i0_2, i1_2) and (i0_3, i1_3) as an inputs, respectively. For example, according to an exemplary embodiment, in the case where i0_0 is a 4-bit unsigned value and i1_0 is a 8-bit unsigned value for an (i0_0, i1_0) pair, 4-bit 0's may be padded on the MSB of i0_0. Alternatively, according to another exemplary embodiment, in the case that i0_1 is a 4-bit complementary number of 2 and i1_1 is a 8-bit complementary number of 2 for an (i0_1, i1_1) pair, the MSB of i0_1 may be expanded by 4 bits.

The second addition areas 221, 222, and 223 may be formed with 1 bit between each of the first addition areas 211, 212, 213, and 214, and may control propagation or blocking of a carry signal that occurs in following first addition areas to preceding first addition areas, or for performing a subtraction operation, control data that adds a value '1' for taking the two's complement may be input to the second addition areas 221, 222, and 223.

Further, according to an exemplary embodiment first addition areas 211, 212, 213 and 214 may all be of uniform size with respect to each other, although variable in size. For example the areas may each be 8 bit, or other sizes. Further, according to another exemplary embodiment the areas can vary in size with respect to each other as well. Specifically, it may be possible for 211 to be 8 bits in length while 212 is 16 bits and 213 is 32 bits, or any other such combination. Each addition area can have different bit length, as far as the data can be divided by the areas 223, 222, and 221. Thus, according to one or more exemplary embodiments, the bit length for the individual addition area can vary.

Figure 3:
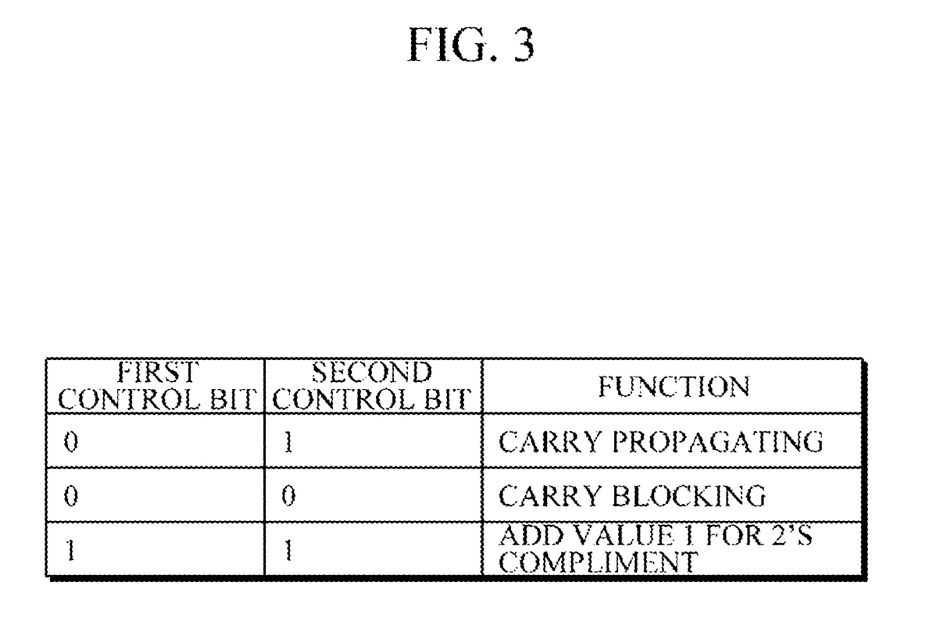
FIG. 3 is an example of control data which is input to second addition areas of an adder according to an exemplary embodiment.

FIG. 3 is an example of control data which may be input to a second addition areas of an adder. The control data input to the second addition areas 221, 222, and 223 may be one of control data [0, 1], [1, 0], [0, 0] and [1, 1].

Further, according to an exemplary embodiment, two inputs may be applied to the first control bit and the second control bit, respectively. Particularly, using a similar structure to that shown in FIG. 2, the inputs to the second addition areas 221, 222, and 223 may be two bit. Further, according to this exemplary embodiment, there may be two multiplexers, as opposed to only one as depicted in FIG. 2, which provided the 2 bit input to the second addition areas.

As shown in FIG. 3, for example, if one operand data is divided into segments and the segments may be separately input to a preceding first addition area and a following first addition area, more specifically, if each of the first addition areas 211, 212, 213 and 214 of FIG. 2 are formed with 8 bits and 16-bit operand data is divided into two segments, which are input to both the preceding first addition area 212 and the following first addition area 211, a bit value [0, 1] or [1, 0] may be input to the second addition area 221 between the first addition areas 212 and 211 to propagate a carry signal that occurs in an addition operation process of the following first addition area 211.

According to another example, when different operand data are simultaneously input to both the following first addition areas and the preceding first addition areas, a bit value [0, 0] may be input to the second addition area between the preceding and following first addition areas to block a carry signal in case of an addition operation, and, in case of a subtraction operation, a bit value [1, 1] may be input to the second addition area to add a value '1' for taking the two's complement.

For instance, a 16-bit first operand data may be divided into segments and the segments are separately input to two of the first addition areas 211 and 212 and also a 16-bit second operand data may also be divided into segments and the segments may be separately input to the other two of the first addition areas 213 and 214. Then, in the case of an addition operation, a bit values [0, 0] may be input to the second addition area 222 between the first addition area 212 to which the first operand data has been input and the first addition area 213 to which the second operand data has been input, in order to prevent a carry from being propagated. Further, in the case where the operation type is a subtraction operation, a bit value [1, 1] may be input to the second addition area 222 in order to add a value '1'.

As illustrated in FIG. 2, the adder 200 may further include second multiplexers 241, 242 and 243 that selectively input control data based on the operand data type and operation type corresponding to each of the second addition areas 221, 222, and 223. For example, the second multiplexer 241 may selectively input value 0 or 1 depending on the operation type such as the addition or subtraction operation, and the operand data type which is input to the first addition areas 211 and 212 adjacent to the second addition area 221, that is, whether one data is divided into segments and the segments are separately input, or two different data are individually input to the first multiplexers 231 and 232.

FIGS. 4A, 4B, 4C, and 4D are diagrams illustrating examples of addition and subtraction operations of an adder. For convenience of description, an adder 200 is assumed to include four first addition areas 211, 212, 213 and 214, each having a length of 2 bits, and three of second addition areas 221, 222 and 223 which are 1-bit.

Figure 4A:
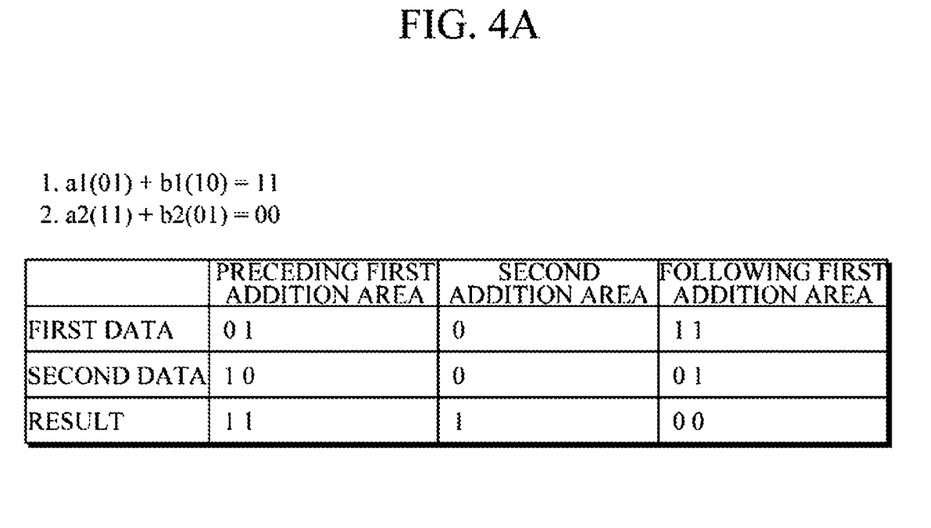
FIGS. 4A through 4D are examples illustrating addition and subtraction operations of an adder according to an exemplary embodiment.

FIG. 4A shows an example that simultaneously performs addition operations of first operand data a1 and b1, and addition operations of second operand data a2 and b2.

Because each of the input operand data type are 2 bits, the first operand data a1 and b1 is input to preceding first addition area 212 in order. Because the operation type is an addition operation, a first multiplexer 232 inputs non-inverted original second data b1, which is input later to the preceding first addition area 212, between the first operand data a1 and b1. Similarly, second operand data a2 and b2 is input to the following first addition area 211, and a first multiplexer 231 inputs non-inverted second data b2 to the following first addition area 211 because it is an addition operation.

In addition, a bit value [0, 0] of control data is input to a second addition area 221 between first addition areas 211 and 212 to block a carry signal that occurs in the following first addition area 211 from being propagated. This is done because each of the pieces of data that are separately input to the following first addition area 211 and preceding first addition area 212, which are both adjacent to the second addition area 221, are two different pieces of data. Also, because the operation type is an addition operation, a second multiplexer 241 corresponding to the second addition area 221 selectively inputs values 0 and 0 to the second addition area 221.

The following first addition area 211 may perform an addition operation of the first operation data, and then may output '00' as a result, and generates a carry signal '1'. The carry signal may be propagated to the second addition area 221, which then adds all of the input control data in consideration of the carry signal and outputs the result '1', and does not generate the carry signal to the preceding first addition area. Because no carry signal is propagated from the second addition area 221, the preceding first addition operation 212 outputs '11' as a result of the addition operation. Finally, the result that came from the second addition area 221 may be ignored and only both results of the following first addition area 211 and preceding first addition area 212 are taken. Then the addition operation result '11' of the first operand data and the addition operation result '00' of the second operand data may be taken.

Figure 4B:
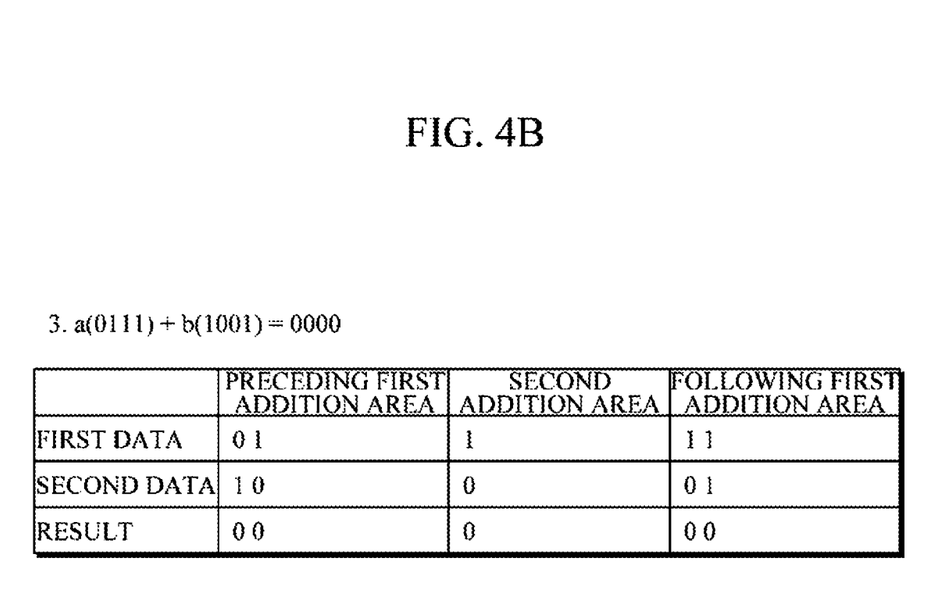

FIG. 4B shows a diagram of performing an addition operation of operand data a and b that include a 4-bit data type.

The input operand data type is 4-bit, and may be separately input to both of the following first addition area 211 and the preceding first addition area 212 in 2 bits. Because the operation type is the addition operation, first multiplexers 231 and 232 corresponding to the following first addition area 211 and the preceding first addition area 212, respectively, may input the non-inverted second data b, which is input later between the first operand data a and b.

Control data [1, 0] which is configured to propagate a carry signal that occurs in the following first addition area 211 may be input to the second addition area 221 between the following first addition area 211 and the preceding first addition area 212. Because data that is input to both of the following first addition area 211 and the preceding first addition area 212 which are both adjacent to the second addition area 221 comes from one data and also the operation type is an addition operation, the second multiplexer 241 corresponding to the second addition area 221 may selectively input values 1 and 0 in order to the second addition area 221.

The following first addition area 211 may add the input operand data and then output a result '00', and generate a carry signal '1'. The carry signal may then be propagated to the second addition area 221, which adds the input control data in consideration of the carry signal, and then outputs a result '0', and then generates a carry signal '1'. The preceding first addition area 212 adds the data that is input based on the carry signal propagated from the second addition area 221 and then as a result of the addition operation, outputs a result '00'. Finally, the result of the second addition area 221 is ignored, and the result received from the following first addition area 211 and preceding first addition area 212 is taken, so the addition operation result '0000' of the operand data may be obtained.

Figure 4C:
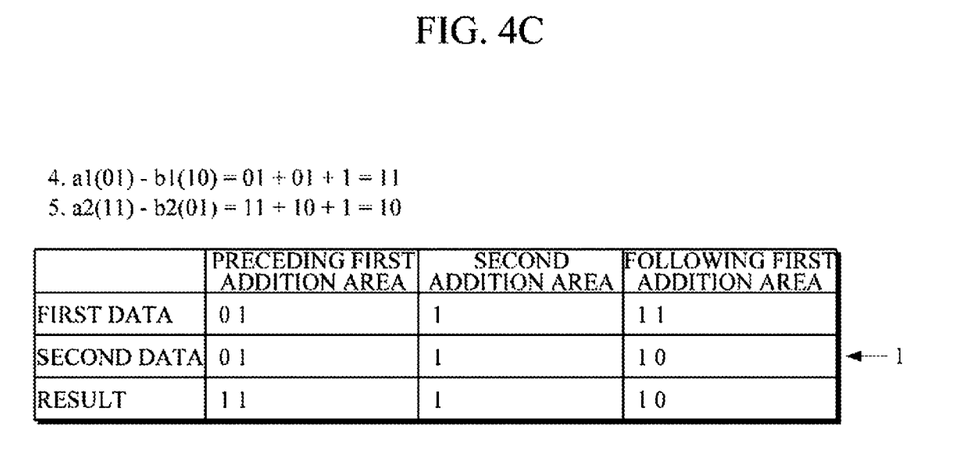

FIG. 4C is a diagram illustrating an example of simultaneously performing a subtraction operation of a first operand data a1 and b1 and a second operand data a2 and b2.

Similar to FIG. 4A, because types of each operand data are 2-bit, each of first operand data a1 and b1 and second operand data a2 and b2 may be input to a preceding first addition area 212 and a following first addition area 211 respectively. Here, the operation type is a subtraction operation, so first multiplexers 231 and 232 may invert second data b1 and b2, which are input later, and input the inverted second data b1 and b2 to the corresponding following first addition area 211 and preceding first addition area 212.

Because each of the pieces of data, which are input to the following first addition area 211 and preceding first addition area 212 and are both adjacent to a second addition area 221, are two different pieces of data and the operation type is a subtraction, a second multiplexer 241 may input control data [1, 1] to the corresponding second addition area 221 to add a value '1' to a result of the first addition area 212. The following first addition area 211 may also perform a subtraction operation, so it is acquired that a value '1' to be added to the following first addition area 211 is input.

Considering the value '1' which is input, the following first addition area 211 may add all the first operand data in the following first addition area 211, and outputs a result '10', and then generates a carry signal '1'. The carry signal is delivered to the second addition area 221, which then considers the input control data [1, 1] and the carry signal and outputs a result '1' and then generates a carry signal '1'. Considering the carry signal that is delivered from the second addition area 221, the preceding first addition area 212 outputs an addition result '11'. Finally, the result of the second addition area 221 may be ignored, and only both results of the following first addition area 211 and preceding first addition area 212 are taken as final results, so the subtraction result '11' of the first operand data a1 and b1 and '10' of the second operand data a2 and b2 are obtained.

Figure 4D:
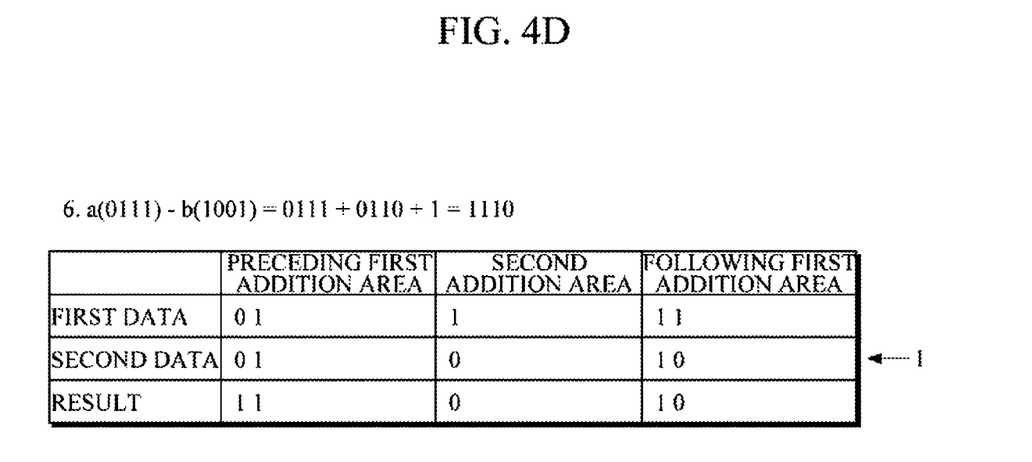

FIG. 4D is a diagram illustrating an example of performing a subtraction operation of operand data a and b of a 4-bit data type.

The operand data type is 4-bit, and may be separately input to both of the following first addition area 211 and preceding first addition area 212 in 2-bits. Here, because the operation type is a subtraction operation, the first multiplexers 231 and 232 corresponding to the following first addition area 211 and preceding first addition area 212 may invert second data b, which is input later, between the first operation data a and b, and then input the inverted second data b to the following first addition area 211 and preceding first addition area 212.

Because data, inputted to the following first addition area 211 and preceding first addition area 212 both adjacent to the second addition area 221, is originally one piece of data, a second multiplexer 241 inputs control data [1, 0] to the second addition area 221. It may then additionally input '1' to add a value '1' for the two's complement to the following first addition area 211.

The following first addition area 211 may add the operand data and the additionally input '1', and outputs a result '10' and generate a carry signal '1'. The carry signal may be delivered to the second addition area 221, which then adds the input control data [1, 0] considering the carry signal and then outputs a result '0' and generates a carry signal '1'. The preceding first addition area 212 may add a carry signal delivered from the second addition area 221 and the input data, and may output an addition result '11'. Finally, the second addition area 221 result may be ignored, and only both results of the following first addition area 211 and preceding first addition area 212 are taken as final results, and then the addition operation result '1110' of the operand data may be obtained As illustrated in examples herein, an adder 200 may not need a plurality of carry-select multiplexers, and may not need to connect a plurality of adders in parallel for supporting various data types, and is capable of supporting a plurality of data types via a single adder, and processing performance and extent efficiency may be increased thereby.

Figure 5:
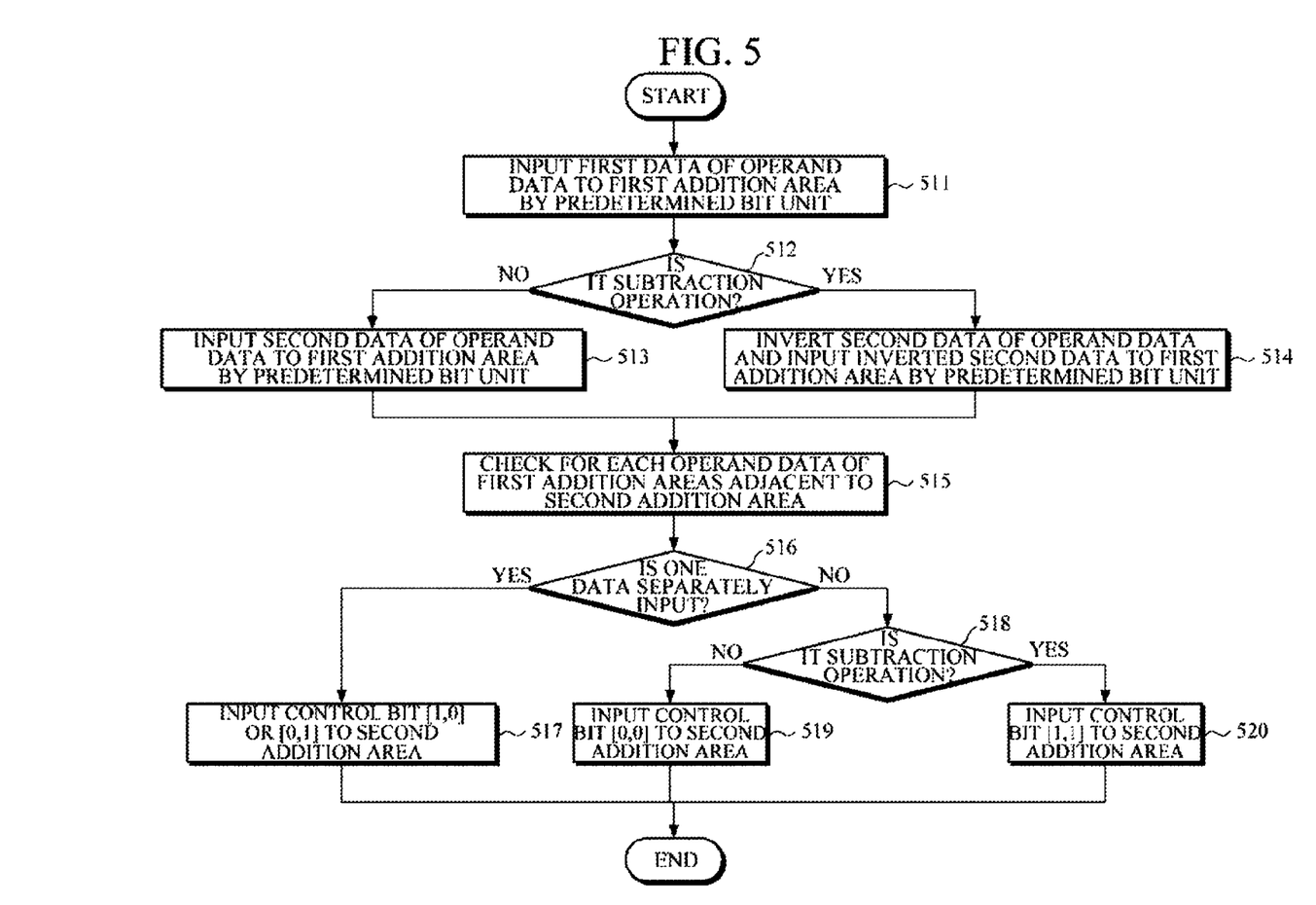
FIG. 5 is a flowchart illustrating an example of a method of supporting a subtraction operation of a plurality of data types according to an exemplary embodiment.

FIG. 5 is a flowchart illustrating an example of a method of supporting a subtraction operation of a plurality of data types. An example of a method of supporting an addition and subtraction operation of a plurality of data types using an adder 200 as illustrated in FIG. 2 is described hereafter.

Initially, an adder 200 inputs first data of operand data to first addition areas 211, 212, 213 and 214 by a predetermined bit unit in operation 511. The operand data may be input to one of the first addition areas, or may be divided into two segments. The data segments may be two or more of the first addition areas depending on the data type.

Then, multiplexers 231, 232, 233 and 234 of the adder 200 determine an operation type in operation 512, and if the operation type is not a subtraction operation, they do not invert the second piece of data of the operand data and input the original second data in operation 513. However, if it is a subtraction operation, the multiplexers 231, 232, 233 and 234 invert the second data and input the inverted second data in operation 514.

Then, second multiplexers 241, 242, and 243 of the adder 200 check the operand data which is input to the first addition areas 211, 212, 213, and 214 adjacent to each of the corresponding second addition areas 221, 222, and 223 in operation 515, and determine whether the operand data type is bigger than predetermined bits. If the operand data type is bigger than predetermined bits, the operand data may be divided into two segments and the data segments are separately input into the adjacent first addition areas 211, 212, 213, and 214 in operation 516.

As a determination result of operation, 516, if one data is divided into two segments and the data segments are separately input, a control data bit [1, 0] or [0, 1] to deliver a carry signal generated in the following first addition area to the preceding first addition area may be input to the second addition area in between in operation 517.

However, if two different pieces of data are input, the operation type is determined in operation 518, and if it is a subtraction operation, control data [1, 1] to add a value '1' to an addition result of the preceding first addition area is input to the second addition area in operation 519. In addition, if the operation type is an addition operation in operation 518, control data [0, 0] may be input to prevent a carry signal of the following first addition area from being propagated to the preceding first addition area in operation 520.

After the adder 200 performs an addition operation using data which is input to the first addition area and second addition area, the adder 200 ignores the output result of the second addition area, takes only a result of the first addition area, and finally obtains a result of the addition and subtraction operations.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An adder comprising:
    a plurality of first addition areas configured to receive pieces of operand data, wherein each of the plurality of first addition areas comprises a predetermined unit number of bits; and
    a plurality of second addition areas configured to receive pieces of control data based on an operand data type and an operation type,
    wherein each of the plurality of second addition areas is arranged between two adjacent first addition areas of the plurality of first addition areas, and
    wherein the adder further comprises first multiplexers, each of the first multiplexers being connected to an associated second addition area, of the plurality of second addition areas, and configured to selectively provide the pieces of control data to the associated second addition area based on the operation type and the operand data type that are inputted to each of the two adjacent first addition areas which are connected to the associated second addition area.

2. The adder of the claim 1, wherein the predetermined unit number of bits is smaller than a maximum number of bits on which the adder is capable of processing an operation.

3. The adder of the claim 1, wherein the pieces of the operand data are received by at least one of the plurality of first addition areas in units of predetermined bits corresponding to the operand data type.

4. The adder of the claim 1, further comprising:
    a plurality of second multiplexers configured to selectively invert or non-invert the operand data, among the pieces of the operand data, before inputting the pieces of the operand data to the plurality of first addition areas, based on the operation type, and then provide resulting data to the plurality of first addition areas.

5. The adder of the claim 1, wherein the pieces of control data are configured to control at least one of propagation or blocking of a carry signal from a following first addition area of the plurality of first addition areas, through one of the plurality of second addition areas that received the pieces of control data, to a preceding first addition area of the plurality of first addition areas, and adding a value of '1' to take a two's complement in response to the operation type being a subtraction.

6. The adder of the claim 5, wherein the pieces of control data that are input to the one of the plurality of second addition areas that is disposed between the preceding first addition area and the following first addition area contain a bit [0, 1] or [1, 0] to transmit a carry signal, in response to one piece of operand data being divided into two segments and the two segments being separately input to the preceding first addition area and the following first addition area.

7. The adder of the claim 5, wherein the pieces of control data that are input to the one of the plurality of second addition areas that is disposed between the preceding first addition area and the following first addition area contain a bit [0, 0] to block the carry signal, in response to the operation type being an addition and two different pieces of operand data being simultaneously input to both the preceding first addition area and the following first addition area.

8. The adder of the claim 5, wherein the pieces of control data that are input to the one of the plurality of second addition areas that is disposed between the preceding first addition area and the following first addition area contain a bit [1, 1] to add the value of '1' for taking the two's complement, in response to the operation type being the subtraction and two different pieces of operand data being simultaneously input to the preceding first addition area and the following first addition area.

9. The adder of the claim 1,
    each of the first multiplexers is configured to selectively input the pieces of control data to the associated second addition area that is disposed between a preceding first addition area, among the plurality of first addition areas and a following first addition area, among the plurality of first addition areas, based on the operand data type that are inputted to the following first addition area and the preceding first addition area and the operation type.

10. The adder of the claim 1, wherein
    each of the plurality of second addition areas is arranged to accept, as an input, a carry signal from one of the two adjacent first addition areas, and to convey, as an output, the carry signal to another one of the two adjacent first addition areas.

11. A method, which supports an addition and a subtraction using an adder, the method comprising:
    inputting pieces of operand data to a plurality of first addition areas each formed with a predetermined unit number of bits in the adder; and inputting pieces of control data based on a type of the operand data and an operation type to a plurality of second addition areas, wherein each of the plurality of second addition areas is arranged between two adjacent first addition areas of the plurality of first addition areas, and wherein the inputting the pieces of control data comprises:

inputting the pieces of control data through multiplexers, each of the multiplexers being connected to an associated second addition area, of the plurality of second addition areas, and configured to selectively provide the pieces of control data to the associated second addition area based on the operation type and the type of the operand data that are inputted to each of the two adjacent first addition areas which are connected to the associated second addition area.

12. The method of the claim 11, wherein the predetermined unit number of bits of a first addition area from among the plurality of first addition areas is smaller than a maximum number of bits on which the adder is capable of processing.

13. The method of the claim 11, wherein the pieces of the operand data are input to at least one first addition area from among the plurality of first addition areas, in units of predetermined bits based on the type of the operand data.

14. The method of the claim 11, wherein the inputting of the pieces of the operand data further comprising:

selectively inverting or non-inverting the operand data, among the pieces of the operand data, before the pieces of the operand data are received at the plurality of first addition areas, based on the operation type; and inputting resulting data to the plurality of first addition areas.

15. The method of the claim 11, wherein the pieces of control data are configured to control at least one of propagation or blocking of a carry signal from a following first addition area of the plurality of first addition areas, through one of the plurality of second addition areas that received the pieces of control data, to a preceding first addition area of the plurality of first addition areas, and adding a value of '1' to take a two's complement in response to the operation type being the subtraction.

16. The method of the claim 15, wherein the pieces of control data that are input to the one of the plurality of second addition areas that is disposed between the preceding first addition area and the following first addition area contain a bit [0, 1] or [1, 0] to transmit a carry signal, in response to one piece of operand data being divided into two segments and the two segments being separately input to the preceding first addition area and the following first addition area.

17. The method of the claim 15, wherein the pieces of control data that are input to the one of the plurality of second addition areas that is disposed between the preceding first addition area and the following first addition area contain a bit [0, 0] to block the carry signal, in response to the operation type being the addition and two different pieces of operand data being simultaneously input to both the preceding first addition area and the following first addition area.

18. The method of the claim 15, wherein the pieces of control data that are input to the one of the plurality of second addition areas that is disposed between the preceding first addition area and the following first addition area contain a bit [1, 1] to add the value of '1' for taking the two's complement, in response to the operation type being the subtraction and two different pieces of operand data being simultaneously input to the preceding first addition area and the following first addition area.

19. The method of the claim 11, wherein the inputting of the pieces of control data comprises:

selectively inputting the pieces of control data to one of the plurality of second addition areas that is disposed between a preceding first addition area and a following first addition area, among the plurality of first addition areas, based on the type of the operand data that is input to the preceding first addition area and the following first addition area and the operation type.

20. An adder comprising:

an addition unit comprising first addition areas to receive operand data and second addition areas to receive control data, wherein each of the second addition areas is arranged between two adjacent first addition areas of the first addition areas, and wherein the addition unit further comprises multiplexers, each of the multiplexers being connected to an associated second addition area, of the second addition areas, and configured to selectively provide the control data to the associated second addition area based on an operation type and a type of the operand data that are inputted to each of the two adjacent first addition areas which are connected to the associated second addition area.

21. The adder of claim 20, wherein the second addition areas are configured to control carry propagation between the first addition areas based on at least one of a bit size of the operand data, the operation type being a subtraction or an addition, and the control data.

22. The adder of claim 21, wherein an output of the second addition areas is ignored.

23. A method configured to operate an adder, the method comprising:

alternating an arrangement of addition areas in an addition unit, the addition unit alternating between first addition areas and second addition areas receiving operand data as an input at the first addition areas;

receiving a control data as the input at the second addition areas; and performing an operation on the operand data based on the control data, wherein each of the second addition areas is arranged between two adjacent first addition areas of the first addition areas, and wherein the receiving the control data comprises receiving the control data through multiplexers, each of the multiplexers being connected to an associated second addition area, of the second addition areas, and configured to selectively provide the control data to the associated second addition area based on an operation type and a type of the operand data that are inputted to each of the two adjacent first addition areas which are connected to the associated second addition area.

24. The adder of claim 23, wherein the second addition areas are configured to control carry propagation between the first addition areas based on at least one of a bit size of the operand data, the operation being a subtraction or an addition, and the control data.

25. The adder of claim 24, wherein an output of the second addition areas is ignored.

* * * * *